United States Patent
Ap

(10) Patent No.: US 6,448,535 B1
(45) Date of Patent: *Sep. 10, 2002

(54) COOLING DEVICE FOR ELECTRIC VEHICLE WITH FUEL CELL

(75) Inventor: Ngy Srun Ap, Saint Remy les Chevreuse (FR)

(73) Assignee: Valeo Thermique Moteur, LaVerriere (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/546,763

(22) Filed: Apr. 11, 2000

(30) Foreign Application Priority Data

Apr. 15, 1999 (FR) .............................. 99 04740

(51) Int. Cl.[7] .............................. F01P 3/00; B60H 1/00; B60K 11/02; B60L 11/18
(52) U.S. Cl. ...................... 219/208; 219/202; 180/65.1; 237/12.3 R; 165/41
(58) Field of Search ................................. 219/208, 202; 392/496; 165/41; 180/65.1, 65.3, 65.4, 65.8; 237/12.3 R, 12.3 B; 62/244; 429/26, 120

(56) References Cited

U.S. PATENT DOCUMENTS

| | | | | |
|---|---|---|---|---|
| 3,626,148 A | * | 12/1971 | Woytowich et al. | ......... 219/208 |
| 3,775,186 A | * | 11/1973 | Cheron | ......................... 429/20 |
| 4,208,570 A | * | 6/1980 | Rynard | ......................... 219/208 |
| 5,058,391 A | * | 10/1991 | Periot | ......................... 62/238.6 |
| 5,537,956 A | * | 7/1996 | Rennfeld et al. | ......... 123/41.29 |
| 6,053,266 A | * | 4/2000 | Greenhill et al. | ........... 180/65.3 |
| 6,186,254 B1 | * | 2/2001 | Mufford et al. | ............. 180/65.3 |

* cited by examiner

*Primary Examiner*—John A. Jeffery
(74) *Attorney, Agent, or Firm*—Morgan & Finnegan, LLP

(57) ABSTRACT

A cooling device for a vehicle with an electric motor powered by a fuel cell has a first cooling loop suitable for cooling the fuel cell and traversed by a first cooling fluid, a second cooling loop suitable for cooling at least the electric motor and traversed by a second cooling fluid, and a heat exchanger interposed between the first cooling loop and the second cooling loop.

22 Claims, 4 Drawing Sheets

COOLING DEVICE FOR ELECTRIC VEHICLE WITH FUEL CELL

FIELD OF THE INVENTION

The invention relates to the cooling of motor vehicles.

It relates more particularly to a cooling device of an electric vehicle powered by a fuel cell

BACKGROUND OF THE INVENTION

Much work is currently being devoted to the development of fuel cells as sources of electrical energy for powering vehicles driven by electric motors.

It is known that a fuel cell transforms into electrical energy the chemical energy produced by a fuel-oxidant pair.

In the case of motor vehicles, the fuel cells which are currently proving to be the most promising are the cells of the membrane type, operating from a source of hydrogen originating either from a bottle carried on board the vehicle, or from a unit producing hydrogen directly in the vehicle. Hence it is possible to produce the hydrogen directly by using a reformer operating with an appropriate fuel, such as methanol, petrol, diesel oil, etc.

In a motor vehicle of the abovementioned type, it is necessary not only to cool the electric motor providing the propulsion of the vehicle as well as the power control for the said motor, but also the fuel cell itself, since the latter is generally supplied with hydrogen and air under pressure, which are usually at a temperature higher than ambient temperature.

The cooling of fuel cells poses certain problems given that it implies using de-ionised water as a cooling fluid. However, this cooling fluid exhibits several drawbacks. First of all, it is incompatible with various materials such as aluminium, copper or steel, for example. Moreover, this fluid freezes as soon as the temperature falls below 0° C. And, needless to say, it is not possible to add antifreeze to this de-ionised water, as in the conventional circuits for cooling engines of motor vehicles.

The invention aims especially to provide a solution to the problems mentioned above.

SUMMARY OF THE INVENTION

According to one aspect of the present invention there is provided a cooling device for a vehicle with an electric motor powered by a fuel cell, the cooling device comprising a first cooling loop suitable for cooling the fuel cell and traversed by a first cooling fluid, a second cooling loop suitable for cooling at least the electric motor and traversed by a second cooling fluid, and a heat exchanger interposed between the first cooling loop and the second cooling loop.

Hence, the fuel cell and at least the electric motor are cooled by two loops using different cooling fluids and exchanging heat between them via an appropriate heat exchanger. That being so, the cooling of the fuel cell is carried out indirectly on the basis of the cooling fluid serving for cooling the motor.

Advantageously, the first cooling loop comprises thermal regulation means for keeping it in an ice-free condition.

These thermal regulation means advantageously comprise at least one electric heating resistance element integrated into a receptacle traversed by the first cooling fluid. This receptacle can be produced particularly in the form of a filling and outgassing vessel integrated into the first cooling loop.

Advantageously, the device further comprises means for thermal insulation of the first cooling loop.

The latter advantageously comprises an electric pump for putting the first cooling fluid into circulation.

In the invention, the second cooling loop advantageously comprises a cooling radiator traversed by the second cooling fluid and suitable for being swept by a flow of air.

According to another characteristic of the invention, the second cooling loop comprises a main branch incorporating the heat exchanger interposed between the first loop and the second loop, a secondary branch incorporating the cooling radiator and a thermostatic valve of the three-way type mounted at the junction of the main branch and of the secondary branch.

According to a further aspect of the invention there is provided a cooling device for a vehicle with an electric motor powered by a fuel cell, the cooling device comprising a first cooling loop suitable for cooling the fuel cell and traversed by a first cooling fluid, a second cooling loop suitable for cooling at least the electric motor and traversed by a second cooling fluid, and a heat exchanger interposed between the first cooling loop and the second cooling loop wherein the second cooling loop comprises a cooling radiator traversed by the second cooling fluid and suitable for being swept by a flow of air wherein the second cooling loop comprises a main branch incorporating the heat exchanger interposed between the first loop and the second loop, a secondary branch incorporating the cooling radiator and a thermostatic valve of the three-way type mounted at the junction of the main branch and of the secondary branch, wherein the second cooling loop moreover comprises a cooling element for cooling the electric motor of the vehicle.

When this electric motor is of the alternating-current type and is controlled by a power control, this cooling element advantageously serves for cooling both the electric motor and the power control.

The abovementioned cooling element may be incorporated either into the main branch of the second cooling loop, or into a diversion from this main branch.

It is advantageous for the second cooling loop further to comprise a heat exchanger for cooling at least one auxiliary unit of the fuel cell.

This heat exchanger may be incorporated into the secondary branch of the second cooling loop, or else into a diversion from the main branch of the second cooling loop.

The second cooling loop advantageously comprises a fan heater for heating the passenger compartment of the vehicle.

Moreover, this second cooling loop advantageously comprises an electric pump for putting the second cooling fluid into circulation.

The heat exchanger interposed between the first cooling loop and the second cooling loop is preferably produced essentially from stainless steel.

BRIEF DESCRIPTION OF THE DRAWINGS

In the description, which follows, given solely by way of example, reference will be made to the attached drawings, in which.

DESCRIPTION OF THE PREFERRED EMBODIMENTS

Figure 1:
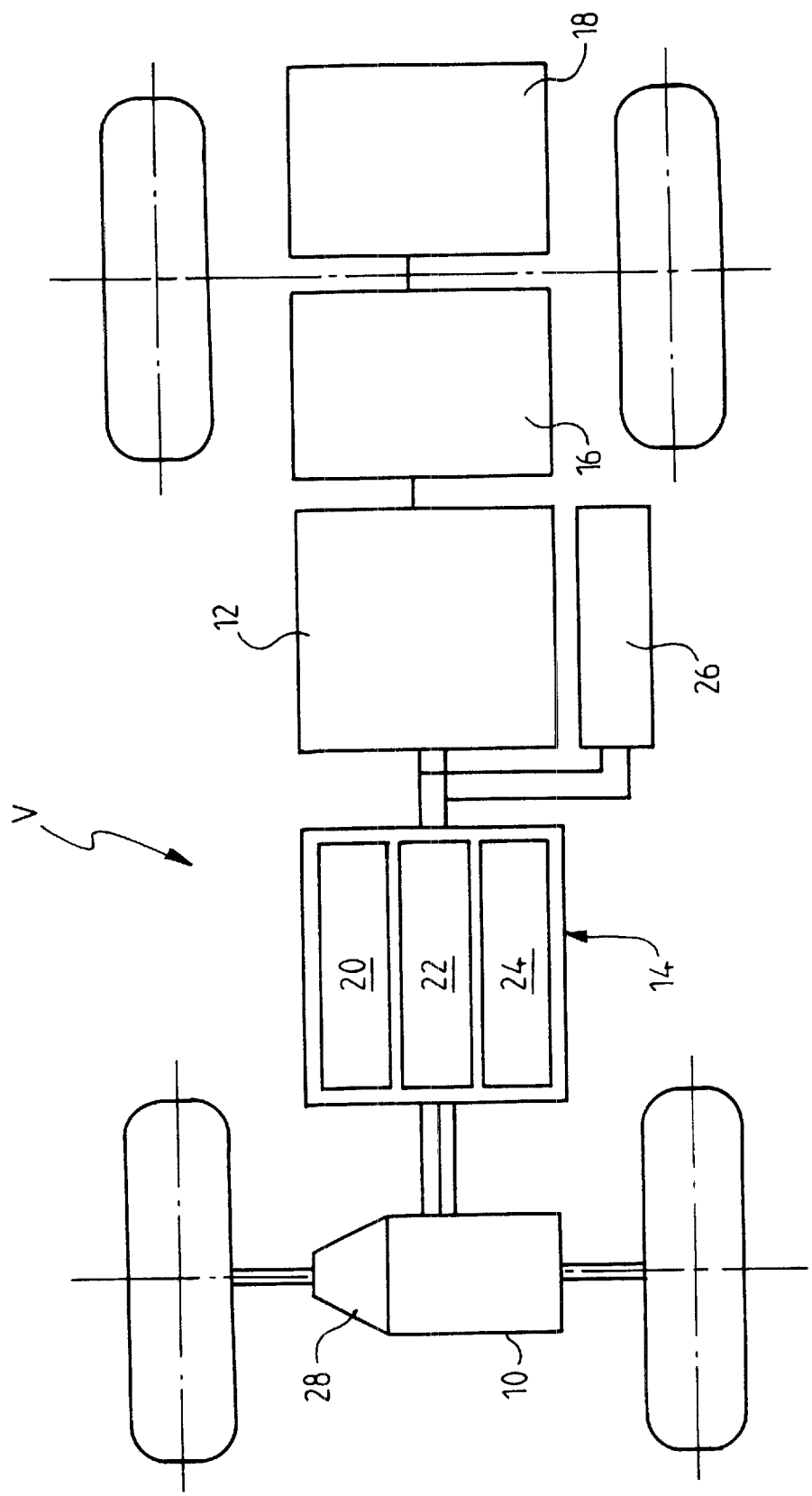
FIG. 1 is a theoretical diagram of a motor vehicle driven by an electric motor powered from a fuel cell.

In the various figures, like reference numerals refer to like parts.

Referring first of all to FIG. 1, a motor vehicle V is shown, which is propelled by an electric motor 10 powered from a fuel cell 12, via a power control 14.

The fuel cell 12 is fed with hydrogen from a reformer 16, which produces this hydrogen from a source of a fuel (methanol, in this example) originating from a tank 18.

The fuel cell 12, which is advantageously of the membrane type, produces a direct electric current, which is sent to the power control 14. The latter comprises an inverter 20 suitable for converting the direct electric current into alternating electric current applied to the electric motor 10, which is of the alternating type. The control 14 further comprises a control module 22 and a converter 24 of the direct current/direct current type. The vehicle further houses batteries 26, of the buffer type, serving especially for starting. The electric motor 10 is coupled to the front wheels of the vehicle by means of a gearbox-axle assembly 28.

In a vehicle of this type, it is necessary to cool not only the electric motor 10 as well as the power control 14, but also the fuel cell 12, which is supplied with hydrogen and with air at a temperature higher than ambient temperature.

Figure 2:
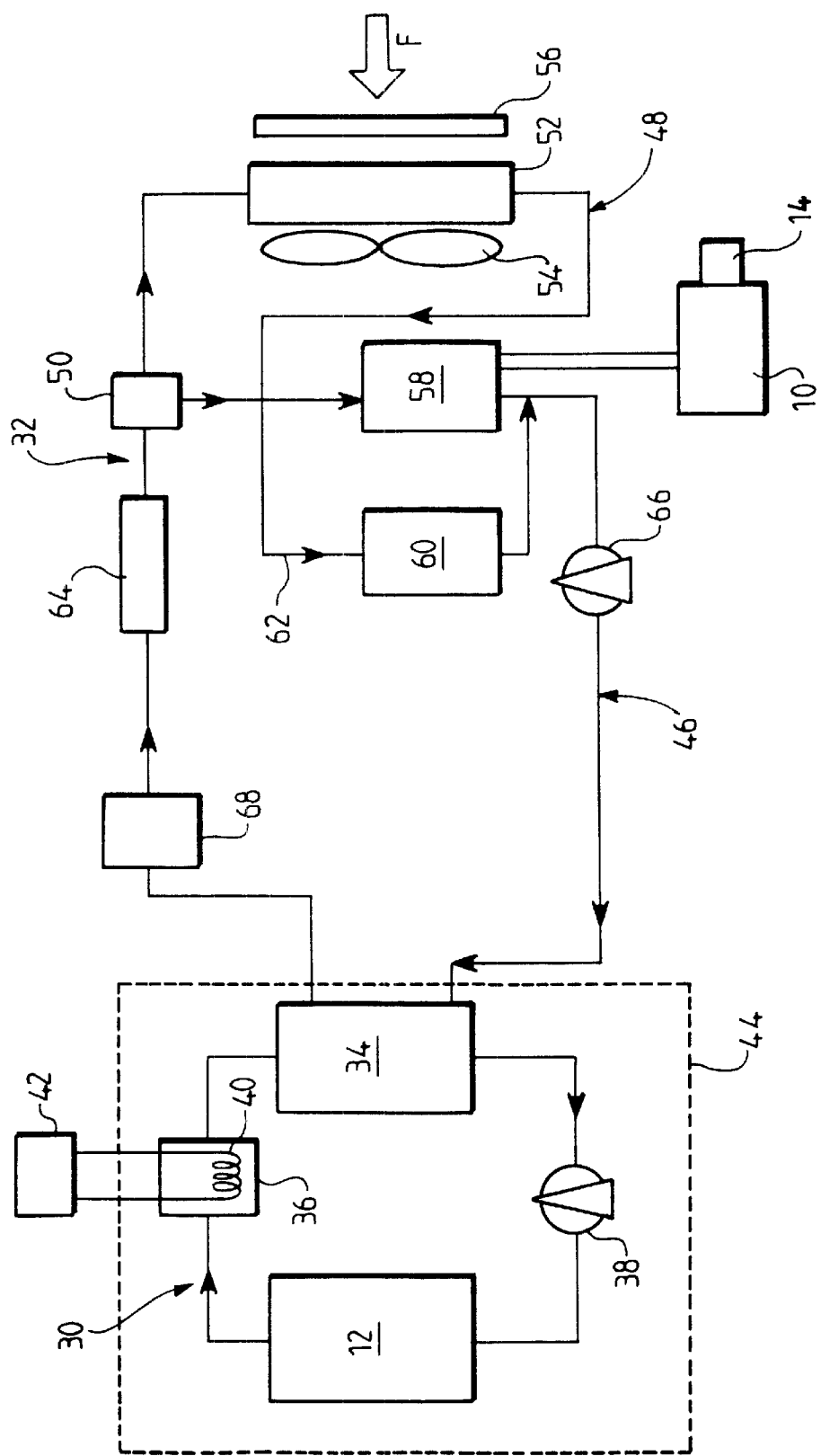
FIG. 2 is a diagram of a cooling device according to the invention suitable for a vehicle of the type represented in FIG. 1.
Figure 3:
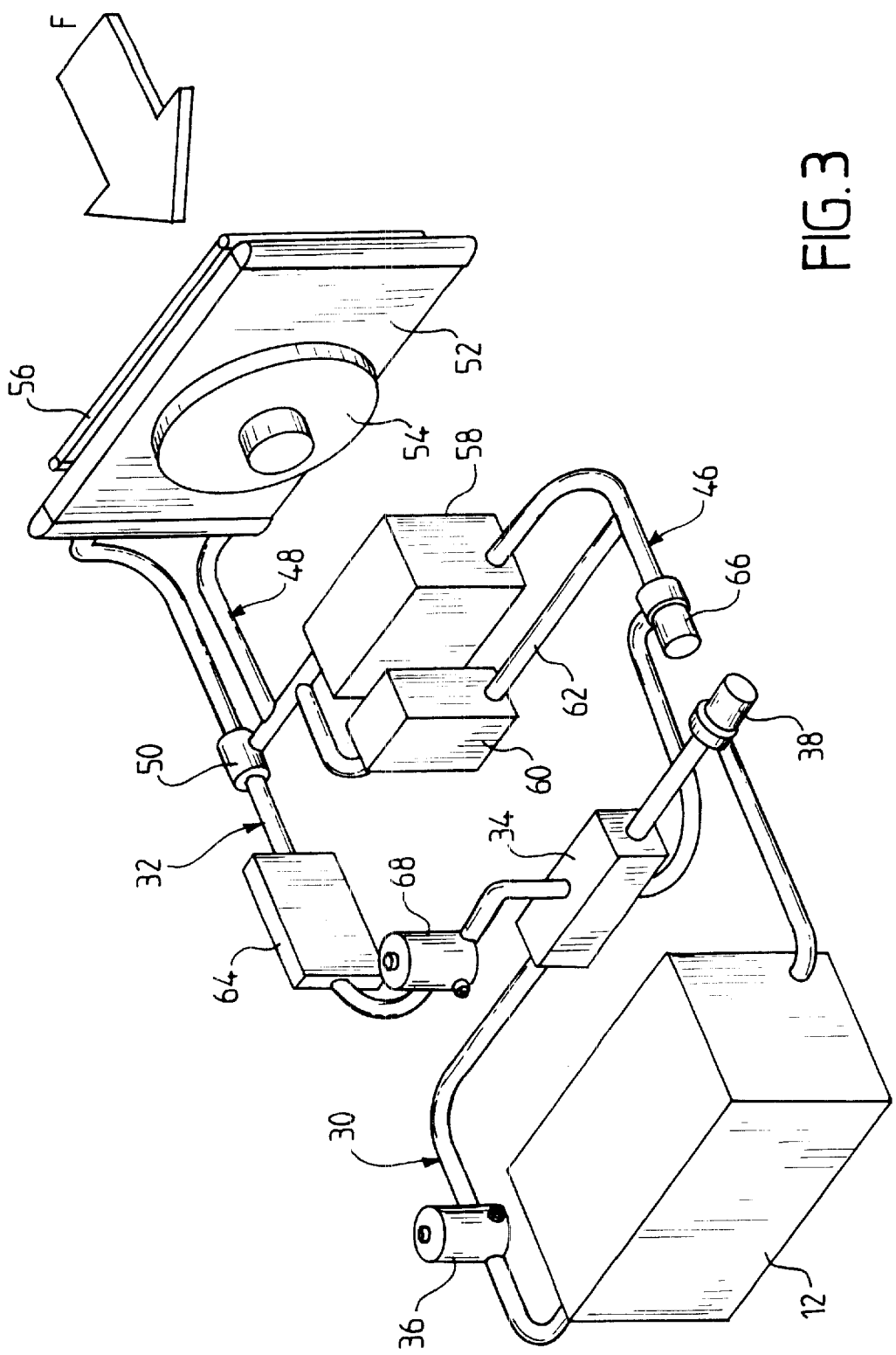
FIG. 3 is a three-dimensional view of the cooling device of FIG. 2.

To that end, it is possible to use a cooling device as represented in FIGS. 2 and 3. In accordance with the diagram of FIG. 2, the device comprises a first cooling loop 30 suitable for cooling the fuel cell 12 and a second cooling loop 32 suitable for cooling the electric motor 10 as well as the power control 14 which is associated with it.

The loop 30 is traversed by a first cooling fluid which is de-ionised water, that is to say pure water, given that this represents the only fluid which can be used for cooling the fuel cell 12.

In contrast, the cooling loop 32 is traversed by a mixture of water and of antifreeze (for example ethylene glycol) as used conventionally in the cooling circuits of motor-vehicle engines.

A heat exchanger 34 of the liquid/liquid type is interposed between the loops 30 and 32 and thus makes it possible to exchange heat between the two loops, without mixing of the cooling fluids.

The heat exchanger 34 may be constituted as a conventional heat exchanger, as long as it is produced from an appropriate material compatible with the two cooling fluids. There is a benefit here in using a heat exchanger constructed essentially from stainless steel.

The first loop 30 comprises a receptacle 36, here produced in the form of a filling and outgassing vessel, serving also for the expansion of the first cooling fluid. The loop further comprises an electric pump 38 suitable for putting the first cooling fluid into circulation in the direction indicated by the arrows.

In order to prevent any risk of the cooling liquid freezing, the device of the invention comprises thermal regulation means here comprising at least one electric heating resistance element 40 incorporated into the vessel 36. This resistance element is linked to an appropriate electrical circuit 42 and is supplied with power as soon as the temperature detected falls close to 0° C. on the positive temperature side, so as to keep the circuits ice free.

Moreover, the device comprises thermal insulation means 44 associated with the loop 30. These advantageously take the form of an insulating enclosure or of another thermal insulation means, which encompasses the whole of the loop 30, including the fuel cell 12 and the heat exchanger 34.

The second loop 32 is traversed by the mixture of water and of antifreeze, and is therefore not subject to freezing. Under these conditions, it is not necessary to surround it with thermal insulation.

The loop 32 is divided essentially into two branches: a main branch 46 and a secondary branch 48. These two branches are linked together by a thermostatic valve 50 of the three-way type, mounted at their junction. The main branch 46 incorporates the heat exchanger 34 interposed between the loops 30 and 32, while the secondary branch 48 incorporates a radiator 52, of the liquid/air type, which is traversed by the second cooling fluid and which is suitable for being swept by a flow of air F originating from outside the vehicle. This flow of air is advantageously blown by a motor-driven fan unit 54.

Face-to-face with the radiator 52 is placed a condenser 56 forming part of a conventional air-conditioning circuit (not represented). Hence, the flow of air can successively sweep the condenser 56 and the cooling radiator 52.

The thermostatic valve 50 is actuated as a function of the temperature of the cooling liquid flowing round the loop 32. When the temperature detected is below a given threshold (generally of the order of 60° C.), the second cooling fluid circulates in closed circuit in the main branch 46, whereas the secondary branch 48 is isolated. In contrast, as soon as the temperature detected reaches or exceeds the abovementioned threshold, the valve 50 makes the second cooling fluid circulate in the main branch 46 and the secondary branch 48, so that the fluid can be cooled by thermal exchange with the flow of air F.

The second loop 32 further comprises a cooling element 58 serving for cooling the electric motor 10 and the power control 14. In this example, the cooling element 58 is incorporated into the main branch 46 of the loop 32.

The loop 32 further comprises a heat exchanger 60 serving for cooling an auxiliary unit of the fuel cell. In this example, the exchanger 60 is incorporated into a diversion 62 from the main branch 46 of the loop 32.

Furthermore, this cooling loop 32 comprises a heating radiator 64, also called fan heater, serving for heating the passenger compartment. This radiator 64 is incorporated into the main branch 46 of the loop 32. It is suitable for being swept by a flow of air which is then sent into the passenger compartment of the vehicle.

Moreover, the cooling loop 32 comprises an electric pump 66 suitable for putting the second cooling fluid into circulation, and an expansion vessel 68. This expansion vessel, which is also incorporated into the main branch 46, serves to compensate for the variations in volume of the second cooling fluid.

Hence, the fuel cell 12 is cooled by de-ionised water flowing round the loop 30 in closed circuit, while the electric motor 10, the power control 14 and the auxiliary unit are cooled by a water-antifreeze mixture flowing round the loop 32. The loops 30 and 32 exchange heat between them via the heat exchanger 34. Hence, the excess heat taken away from the cell is transferred to the loop 32 and this heat is eliminated by thermal exchange with the flow of air F.

In the event that the ambient temperature (or outside temperature) falls below 0° C., the thermal regulation means automatically come into operation so as to heat the de-ionised water, in order to prevent any risk of freezing of the first loop 30. These risks are also minimised by the presence of the thermal insulation 44.

The device of FIG. 2 can be produced in compact form, as FIG. 3 shows. In this figure, the same elements as in the case of FIG. 2 are again found, and are designated by the same numerical references.

Figure 4:
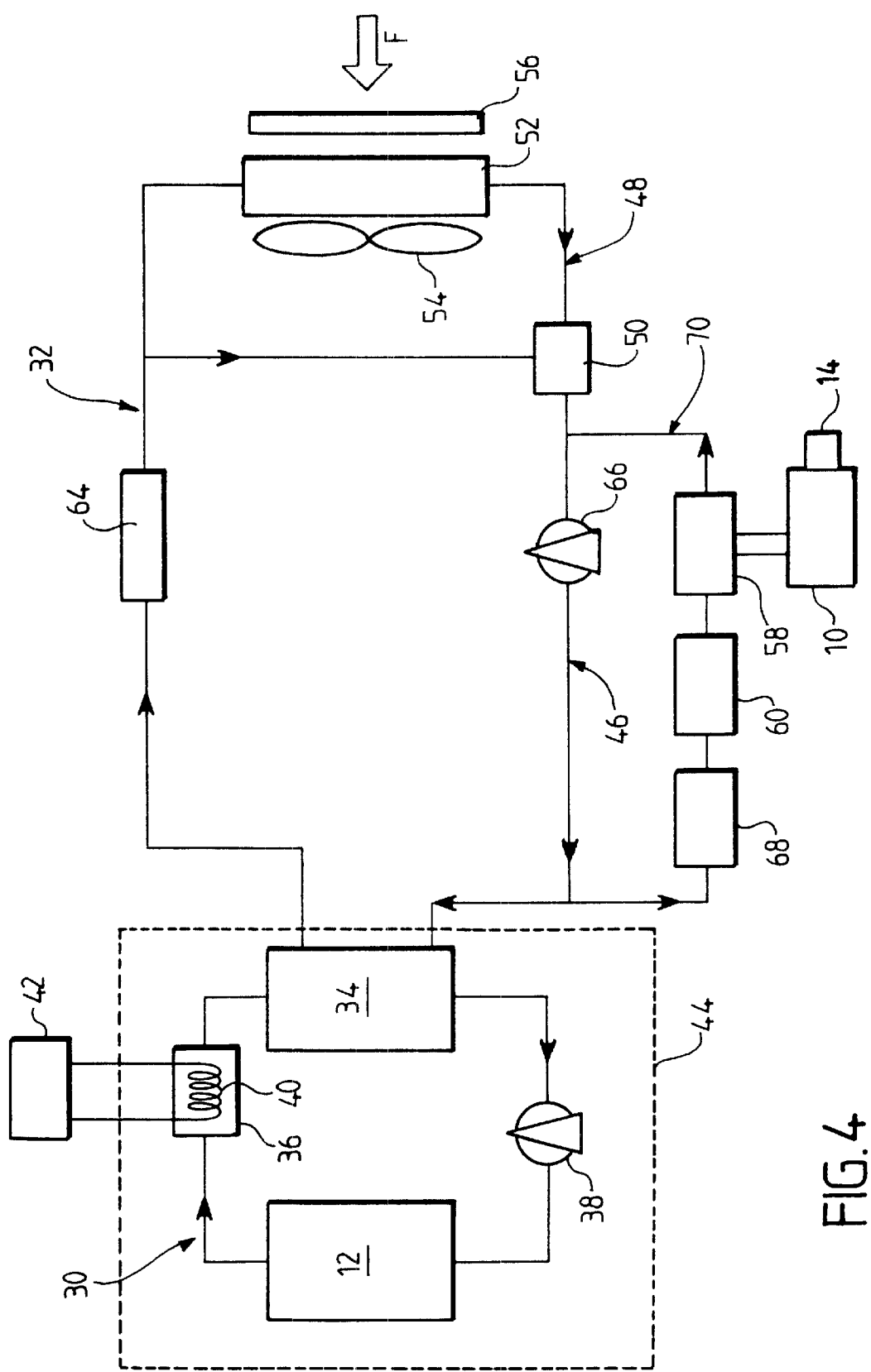
FIG. 4 is a diagram similar to that of FIG. 2 in a variant embodiment.

Referring now to FIG. 4, a diagram of a circuit similar to that of FIG. 2 is represented, in a variant embodiment. The same elements are again found, designated under the same numerical references.

With respect to the embodiment of FIG. 2, that of FIG. 4 differs essentially in the fact that the cooling device 58, the heat exchanger 60 and the expansion vessel 68 are incorporated into a diversion 70 from the main branch 46. Otherwise, the device of FIG. 4 functions substantially in the same way as that of FIG. 2.

Needless to say, the invention is not limited to the embodiments described above by way of example and extends to other variants.

Hence, it will be understood that the first loop 30 and the second loop 32 are susceptible of variants, as long as they exchange heat between them by means of a heat exchanger.

The invention applies to the motor vehicles driven by electric motors supplied by fuel cell. The fuel cell is also susceptible of numerous variants, being supplied with hydrogen possibly originating from a hydrogen bottle or from a hydrogen-production unit.

What is claimed is:

1. A cooling device for a vehicle with an electric motor powered by a fuel cell, the cooling device comprising a first cooling loop suitable for cooling the fuel cell and traversed by a first cooling fluid, a second cooling loop suitable for cooling at least the electric motor and traversed by a second cooling fluid, a fan heater for heating a passenger compartment of the vehicle, and a heat exchanger interposed between the first cooling loop and the second cooling loop, wherein the fan heater is separate and distinct from the heat exchanger.

2. The device of claim 1, wherein the cooling loop comprises thermal regulation means for keeping the cooling loop in an ice-free condition.

3. The device of claim 2, wherein the thermal regulation means comprise at least one electric heating resistance element integrated into a receptacle traversed by the first cooling fluid.

4. The device of claim 3, wherein the receptacle is a filling and outgassing vessel integrated into the first cooling loop.

5. The device of claim 1, wherein the first cooling loop comprises an electric pump suitable for putting the first cooling fluid into circulation.

6. The device of claim 1, wherein the second cooling loop comprises a cooling radiator traversed by the second cooling fluid and suitable for being swept by a flow of air.

7. The device of claim 1, wherein the second cooling loop further comprises a heat exchanger for cooling at least one auxiliary unit of the fuel cell.

8. The device of claim 1, wherein the second cooling loop comprises the fan heater for heating the passenger compartment of the vehicle.

9. The device of claim 1, wherein the second cooling loop comprises an electric pump suitable for putting the second cooling fluid into circulation.

10. The device of claim 1, wherein the heat exchanger interposed between the first cooling loop and the second cooling loop is produced essentially from stainless steel.

11. A cooling device for a vehicle with an electric motor powered by a fuel cell, the cooling device comprising a first cooling loop suitable for cooling the fuel cell and traversed by a first cooling fluid, a second cooling loop suitable for cooling at least the electric motor and traversed by a second cooling fluid, and a heat exchanger interposed between the first cooling loop and the second cooling loop wherein the second cooling loop comprises a cooling radiator traversed by the second cooling fluid and suitable for being swept by a flow of air wherein the second cooling loop comprises a main branch incorporating the heat exchanger interposed between the first loop and the second loop, a secondary branch incorporating the cooling radiator and a thermostatic valve of the three-way type mounted at the junction of the main branch and of the secondary branch, wherein the second cooling loop moreover comprises a cooling element for cooling the electric motor of the vehicle.

12. The device of claim 11, in which the electric motor is of the alternating-current type and is controlled by a power control, wherein the said cooling element serves for cooling the electric motor and for cooling the power control.

13. The device of claim 11, in which the said cooling element for cooling the electric motor is incorporated into the main branch of the second cooling loop.

14. The device of claim 11, wherein the said heat exchanger for cooling the electric motor is incorporated into a diversion from the main branch of the second cooling loop.

15. The device of claim 11, wherein the second cooling loop further comprises a heat exchanger for cooling at least one auxiliary unit of the fuel cell.

16. The device of claim 15, wherein the said heat exchanger for cooling the auxiliary unit is incorporated into the secondary branch of the second cooling loop.

17. The device of claim 15, wherein the said heat exchanger for cooling the auxiliary unit is incorporated into a diversion from the main branch of the second cooling loop.

18. The device of claim 9, wherein the second cooling loop comprises a fan heater for heating the passenger compartment of the vehicle.

19. The device of claim 11, wherein the second cooling loop comprises an electric pump suitable for putting the second cooling fluid into circulation.

20. The device of claim 11, wherein the heat exchanger interposed between the first cooling loop and the second cooling loop is produced essentially from stainless steel.

21. A cooling device for a vehicle with an electric motor powered by a fuel cell, the cooling device comprising a first cooling loop suitable for cooling the fuel cell and traversed by a first cooling fluid, a second cooling loop suitable for cooling at least the electric motor and traversed by a second cooling fluid, a heat exchanger interposed between the first cooling loop and the second cooling loop, and a means for thermal insulation of the first cooling loop.

22. A cooling device for a vehicle with an electric motor powered by a fuel cell, the cooling device comprising a first cooling loop suitable for cooling the fuel cell and traversed by a first cooling fluid, a second cooling loop suitable for cooling at least the electric motor and traversed by a second cooling fluid, and a heat exchanger interposed between the first cooling loop and the second cooling loop, wherein the second cooling loop comprises a cooling radiator traversed by the second cooling fluid and suitable for being swept by a flow of air, wherein the second cooling loop comprises a main branch incorporating the heat exchanger interposed between the first loop and the second loop, a secondary branch incorporating the cooling radiator and a thermostatic valve of the three-way type mounted at the junction of the main branch and of the secondary branch.

* * * * *

UNITED STATES PATENT AND TRADEMARK OFFICE
CERTIFICATE OF CORRECTION

PATENT NO.    : 6,448,535 B1  
DATED         : September 10, 2002  
INVENTOR(S)   : Ngy Srun Ap It is certified that error appears in the above-identified patent and that said Letters Patent is hereby corrected as shown below:

<u>Column 6,</u>
Line 35, delete "of claim 9" and insert therefor -- of claim 11 --.

Signed and Sealed this

Twelfth Day of November, 2002

*Attest:*

*Attesting Officer*

JAMES E. ROGAN  
*Director of the United States Patent and Trademark Office*